United States Patent [19]
Brunazzi

[11] Patent Number: 5,447,081
[45] Date of Patent: Sep. 5, 1995

[54] GEARCASE FOR TRANSMITTING MOTION WITH DIFFERENT SPEEDS TO AT LEAST TWO DRIVING SHAFTS FOR POWER DEVICES IN SELF-PROPELLED FARM MACHINES

[75] Inventor: Achille Brunazzi, S. Vittoria, Italy

[73] Assignee: Comer S.P.A., Villanova DI Reggiolo, Italy

[21] Appl. No.: 184,338

[22] Filed: Jan. 21, 1994

[30] Foreign Application Priority Data

Jan. 25, 1993 [IT] Italy .............................. MO93A0006

[51] Int. Cl.[6] .............................................. F16H 1/22
[52] U.S. Cl. ................................. 74/15.4; 74/665 GC
[58] Field of Search .................... 74/15.4, 15.8, 15.82, 74/665 GA, 665 GC, 665 GD, 665 H

[56] References Cited

U.S. PATENT DOCUMENTS

| | | | |
|---|---|---|---|
| 2,521,729 | 9/1950 | Keese | 74/15.4 |
| 2,821,868 | 2/1958 | Gregory | 74/15.8 |
| 2,945,382 | 7/1960 | Ritter et al. | 74/15.4 |
| 4,523,493 | 6/1985 | Weib | 74/15.8 |
| 5,090,268 | 2/1992 | Peeters | 74/665 GC |

*Primary Examiner*—Dirk Wright

[57] ABSTRACT

The gearcase for transmitting motion with different speeds to at least two driving shafts in self-propelled farm machines forms two contiguous chambers and has a driving shaft. A main driving shaft enters a first chamber, and has a head which extends into a second chamber for transmission meshing with a driven shaft. Another driven shaft is provided with a set of speed-shifting gears, is arranged below and parallel to the main driving shaft and transmits motion to a third driven shaft accommodated in a housing lying below the first chamber.

7 Claims, 2 Drawing Sheets

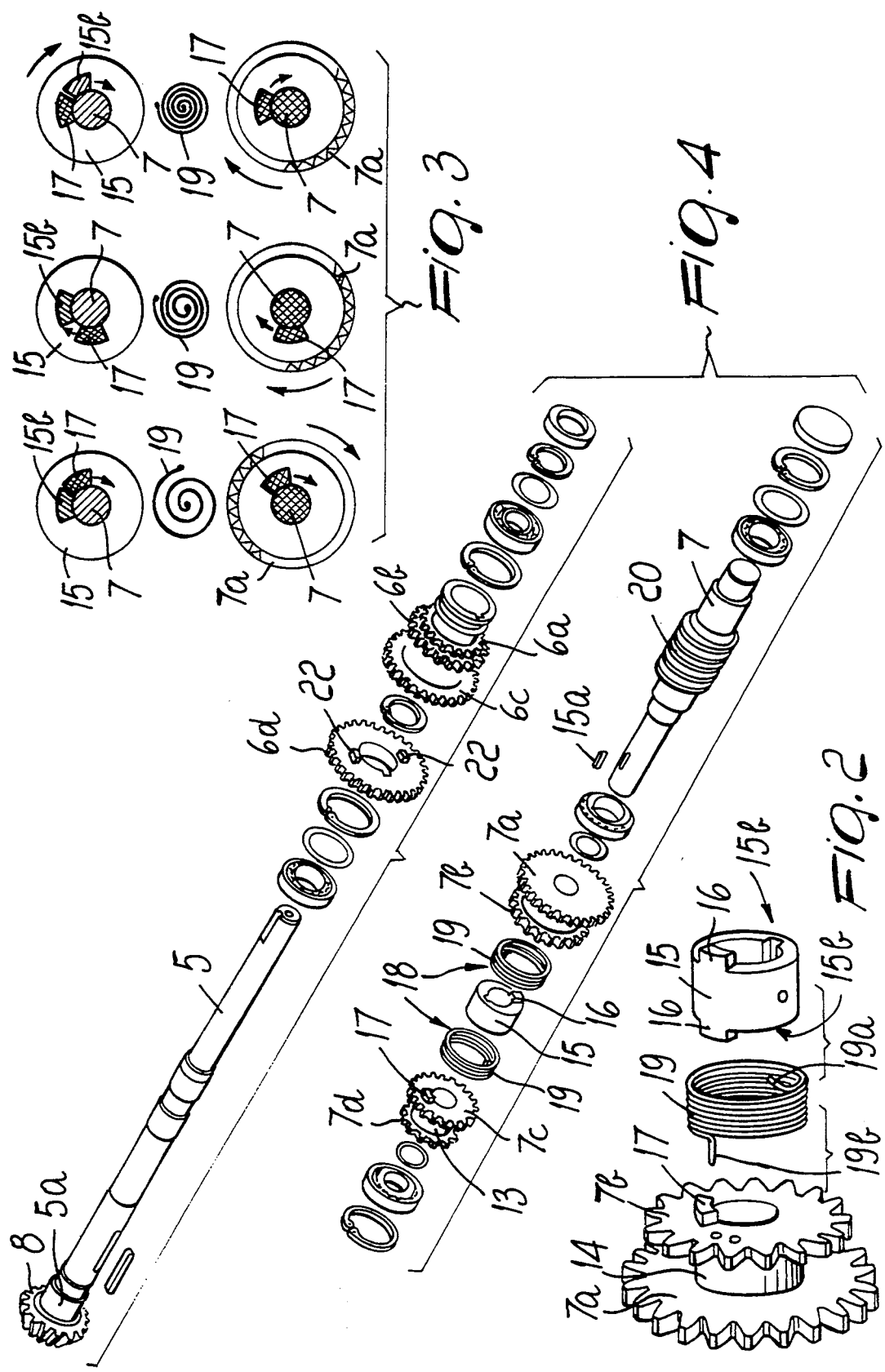

GEARCASE FOR TRANSMITTING MOTION WITH DIFFERENT SPEEDS TO AT LEAST TWO DRIVING SHAFTS FOR POWER DEVICES IN SELF-PROPELLED FARM MACHINES

BACKGROUND OF THE INVENTION

The present invention relates to a gearcase for transmitting motion with different speeds to at least two driving shafts for power devices in self-propelled farm machines.

Machines for use in the farming industry, specifically trailers towed by tractors for spreading forage, employ mechanisms that cause stored forage to slide on a platform of the trailer, gradually sending it toward one end of the trailer proximate to which a spreading unit is installed; the spreading unit is essentially constituted by one or more augers or scrolls having parallel and horizontal axes and which, by rotating, pick up the forage that arrives from the body and expel it outward.

In order to move said forage, the body has a conveyor belt constituted by a series of cross-members supported at their ends by motor-driven chains and move parallel to the bottom of the body so as to be flush with it.

Due to operating requirements, advancement of the conveyor belt and rotation of the scrolls must occur at different speeds.

This need is currently met from a technical standpoint by resorting to the use of a large number of gears which are mutually connected by chain-type transmissions coupled to said gears; for the sake of constructive simplicity and in order to accordingly contain production costs, said gears are arranged unprotected in regions of the machine which are close to the scroll connection and belt traction points.

This unprotected arrangement allows said gears, as well as all the mechanical components which cooperate with them in meeting the described technical requirement, to be easily damaged by external factors, such as bad weather and others.

Furthermore, the unavoidable need to contain costs has forced manufacturers to build the known devices in the simplest manner, depriving them of any synchronization device suitable to allow meshing and disengagement during the movement of the mechanisms suitable to provide overall movement, subjecting said gears to a very tough duty cycle and consequently requiring them to be oversized.

SUMMARY OF THE INVENTION

The aim of the present invention is to provide a gearcase for transmitting motion with different speeds to at least two driving shafts for power devices in self-propelled farm machines which allows to contain, in a single closed protective body, all the components for providing motion at different speeds, furthermore providing said components with a simple and effective synchronization device having the lowest possible production cost.

With the above aim in view, the invention provides a gearcase for transmitting motion with different speeds to at least two driving shafts for power devices in self-propelled farm machines, comprising a first chamber for the entry and support of the driving shaft, on which a multiple-gear pinion is keyed and is actuated for moving forward and backward; said multiple gears meshing with corresponding velocity-ratio gears keyed on a first driven shaft which is also supported so that it can rotate in said first chamber; said driven shaft extending with its head, having a meshing and transmission gear, into a second chamber which is contiguous to said first chamber and in which a second shaft is supported transversely; said second shaft being driven by means of said meshing gear; a housing for supporting and containing a third shaft provided below said first chamber; said third shaft being driven by said first shaft by virtue of transmission mechanisms; and synchromesh means provided between said velocity-ratio gears.

Advantageously, the gearcase for transmitting motion with different speeds to at least two driving shafts for power devices in self-propelled farm machines has four velocity-ratio gears which are monolithically combined in pairs in two pinions.

Conveniently, in the gearcase for transmitting motion with different speeds to at least two driving shafts for power devices in farm machines, synchromesh means are interposed between said pinions and are constituted by a bush which is rigidly keyed on the first driven shaft and has, on each face directed toward the oppositely arranged pinion, at least one tooth for meshing with a corresponding counter-tooth which extends from the pinion after rotating the bush with respect to the pinion; elastic parts that can be subjected to torque are furthermore provided between said pinions and said bush and for gradually cancelling the velocity difference between the gears and the bush by virtue of said torque once meshing has occurred.

BRIEF DESCRIPTION OF THE DRAWINGS

Further characteristics and advantages of the invention will become apparent from the description of a preferred but not exclusive embodiment of a gearcase for transmitting motion with different speeds to at least two driving shafts for power devices in farm machines, illustrated only by way of non-limitative example in the accompanying drawings, wherein:

FIG. 2 is an enlarged-scale view of a detail of the synchromesh means;

FIG. 3 is a schematic diagram illustrating the operation of said synchromesh means; and FIG. 4 is an exploded view of the gears keyed on a driving shaft and on a first driven shaft.

DESCRIPTION OF THE PREFERRED EMBODIMENTS

Figure 1:
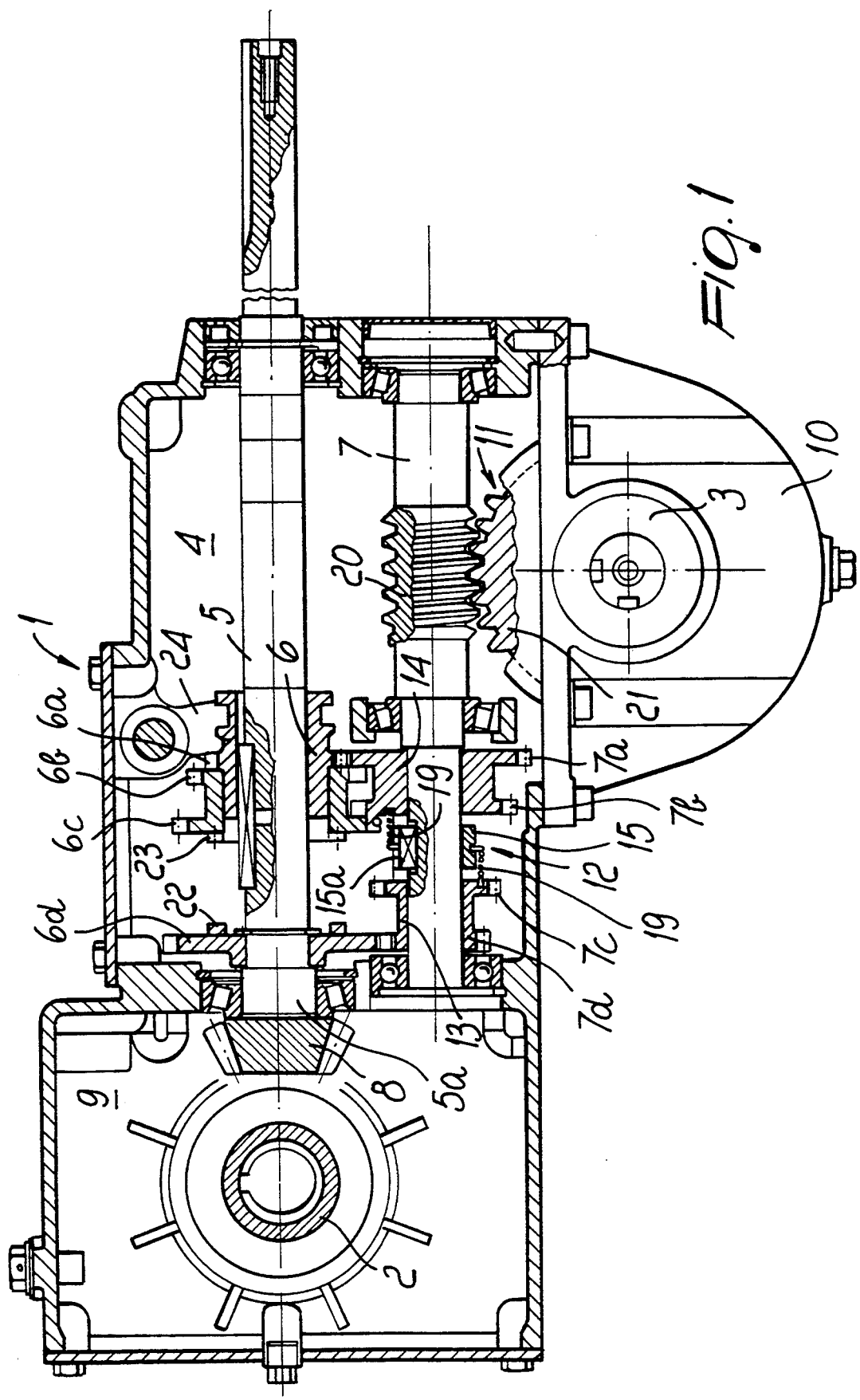
FIG. 1 is a sectional view of the present invention.

With particular reference to the above figures, the reference numeral 1 generally designates a gearcase for transmitting motion with different speeds to at least two driving shafts 2, 3 for power devices in self-propelled farm machines; said gearcase is internally divided into two chambers, namely a first chamber 4 and a second chamber 9.

A driving shaft 5 is supported in the first chamber 4, and a pinion 6 is keyed on said driving shaft; said pinion 6 has multiple gears 6a, 6b and 6c which can mesh, following the controlled sliding of the pinion 6 along the shaft 5, with corresponding gears 7a, 7b and 7c having different tooth ratios and in turn keyed on a first driven shaft 7 which is in turn supported inside the first chamber 4 and lies below the driving shaft 5 and parallel to it. Said driving shaft 5 extends into the second chamber 9 with its head 5a, which has a meshing and transmission gear 8, and engages at right angles with a third driven shaft 2 which is suitable for actuating a corresponding power device of a farm machine, which however is not shown in the drawings for the sake of simplicity.

The third driven shaft 3 for the actuation of additional power devices is driven by the first driven shaft 7 by virtue of associated transmission mechanisms 11 comprising a worm screw 20 which is formed on said first driven shaft 7 and meshes with a gear 21 keyed on the third driven shaft 3, contained in a housing 10 extending below the first chamber 4.

The gears 7a, 7b and 7c that determine the various velocity ratios are grouped in two pinions 13 and 14, between which synchromesh means 12 are interposed.

In the preferred embodiment of the invention there is a total of four velocity ratios; the fourth ratio is obtained by coupling an associated gear 7d with a gear 6d which is freely supported by the driving shaft 5 and has front engagement means 22 coupleable to an equal number of oppositely arranged engagement means 23 extending from the pinion 6.

Said synchromesh means 12 interposed between the pinions 13 and 14 consist of a bush 15 which, by means of a key 15a, is rigidly keyed on the first driven shaft 7 and has, on opposite faces 15b, teeth 16 which mesh with counter-teeth 17 extending from each pinion 13 and 14; helical springs 19 are also provided between said pinions and the bush 15, and form the elastic parts 18; their ends 19a and 19b are connected respectively to the bush 15 and to the pinions 13 and 14.

Operation of the invention is as follows: the driving shaft 5 transmits motion, with the fixed transmission ratio set by the gear 8, to the second driven shaft 2 which, in the specific case, turns a series of ejection augers or scrolls in a forage distribution truck.

At the same time, by means of the gradual mutual meshing of the gears 6a, 6b, 6c, 6d and 7a, 7b, 7c, 7d, the same motion, but at different speeds, is transmitted to the first driven shaft 7 and by said driven shaft, by means of the worm screw 20 coupled to the gear 21, to the third driven shaft 3 which, once again in the forage spreading truck, moves the platform of the containment body.

Engagement of the various speeds is produced by means of a conventional thrust fork 24 and produces, for each speed, the immediate meshing of the teeth with the respective counter-teeth, rotating the corresponding meshed pinion; said pinion, which is freely mounted on the first driven shaft 7, progressively loads, by rotating, the spring 19, the ends 19a and 19b whereof are respectively coupled to the bush 15, which is rigidly connected to said shaft 7, and to the corresponding meshed pinion and, as schematically shown in FIG. 3, said spring elastically and gradually transmits the beginning of the rotation to said first driven shaft 7 until the tooth 15b abuts against the counter-tooth 17, thus providing the conventional rigid coupling for transmitting the rotary motion.

Essentially, the intervention of the spring 19 prevents the jerking of the driven shaft 7 which would occur if each speed were engaged directly.

When the meshed pinion is disconnected, the corresponding spring 19 interposed between said pinion and the bush 15 is released and resets itself for subsequent use.

It should also be noted that all the components of the invention are enclosed and protected within a casing 1 which has a very compact shape and size and can accordingly be located in any part of the farm machine with no danger of wear and damage from outside.

In practice it has been observed that the described invention achieves the intended aim.

The invention thus conceived is susceptible to modifications and variations, all of which are within the scope of the inventive concept.

All the details may furthermore be replaced with other technically equivalent elements.

In the practical embodiment of the invention, the materials employed, as well as the shapes and dimensions, may be any according to the requirements without thereby abandoning the protective scope of the following claims.

I claim:

1. Gearcase for transmitting motion with different speeds to at least two driving shafts for power devices in self-propelled farm machines, comprising a first chamber for the entry and support of the driving shaft, on which a multiple-gear pinion is keyed and is conventionally actuated for moving forward and backward; said multiple gears meshing with corresponding velocity-ratio gears keyed on a first driven shaft which is also supported for rotation in said first chamber; said driving shaft extending with its head, having a meshing and transmission gear, into a second chamber which is contiguous to said first chamber and in which a second shaft is supported transversely; said second shaft being driven by means of said meshing gear; a housing for supporting and containing a third shaft being provided below said first chamber; said third shaft being driven by said first shaft through transmission mechanisms; and synchromesh means provided between said velocity-ratio gears.

2. Gearcase according to claim 1, comprising four velocity-ratio gears combined monolithically in pairs in two pinions.

3. Gearcase according to claim 2, wherein said synchromesh means are interposed between said pinions and each consists of a bush rigidly keyed on the first driven shaft and has, on each face directed toward the oppositely arranged pinion, at least one tooth for meshing with a corresponding counter-tooth extending from each pinion, following a rotation of the bush with respect to the pinion; elastic parts that can be subjected to torque being furthermore provided between said pinions and said bush and being suitable for gradually eliminating the velocity difference between the gears and the bush by means of said torque once meshing has occurred.

4. Gearcase according to claim 3, wherein each one of said elastic parts is constituted by a helical spring, the ends whereof are respectively coupled to the bush and to the corresponding pinion.

5. Gearcase according to claim 1, wherein said driving shaft and said first driven shaft are mutually parallel and that the driving shaft lies above the driven shaft.

6. Gearcase according to claim 1, wherein said second and third driven shafts are mutually parallel and lie at right angles to said driving shaft and to said first driven shaft.

7. Gearcase according to claim 1, wherein said transmission mechanisms are constituted by a worm screw formed coaxially on said first driven shaft and coupled to a gear which is keyed on the third driven shaft.

* * * * *